May 21, 1935.  H. HÖME  2,002,397
HYDRAULIC SHOCK ABSORBER FOR AUTOMOBILES
Filed Oct. 25, 1933    2 Sheets-Sheet 1

May 21, 1935.　　　　　H. HÖME　　　　2,002,397
HYDRAULIC SHOCK ABSORBER FOR AUTOMOBILES
Filed Oct. 25, 1933　　　2 Sheets-Sheet 2

INVENTOR
Hugo Höme,
By Watson, Coit, Morse & Grindle
ATTYS.

Patented May 21, 1935

2,002,397

UNITED STATES PATENT OFFICE 2,002,397

HYDRAULIC SHOCK ABSORBER FOR AUTOMOBILES

Hugo Höme, Essen, Germany

Application October 25, 1933, Serial No. 695,196
In Germany November 10, 1932

4 Claims. (Cl. 267—11)

This invention relates to hydraulic shock-absorbing devices for vehicles such as road vehicles and is concerned with such devices of the type in which a double-acting hydraulic shock-absorber is employed at each side of the vehicle and means is provided for the passage of the working liquid from each working chamber of one shock-absorber to the opposite working chamber of the other shock-absorber. The arrangement is such that a relative movement of the sprung and unsprung parts at one side of the vehicles, produces similar movement at the other side of the vehicle, and thus rolling or tilting of the vehicle, for instance, taking curves, is minimized, and the tendency of road vehicles to skid under such circumstances is prevented.

An object of the present invention is to obtain a slight damping of the equalizing action of shock-absorbers for small relative movements of the sprung and unsprung parts and, according to the invention, there is provided a hydraulic shock-absorbing device of the above-mentioned type wherein means is provided automatically to transfer a portion of the working liquid to an auxiliary chamber under the action of only comparatively small movements transmitted to the shock-absorber. The full transfer of the liquid from one side to the other is thus prevented under the influence of slight shocks and the required slight damping of the action of the shock-absorbers in these circumstances is obtained.

According to a feature of the invention, the auxiliary chambers of the shock-absorbers at opposite sides of the vehicle are connected by a compensating conduit for the purpose of equalizing the distribution of the working liquid between the shock-absorbers.

In one arrangement the transfer means aforesaid for the working liquid comprises a passage for conveying working fluid to the auxiliary chamber and valve means automatically closing the passage under the action of heavy loads on the shock-absorber.

The invention will be more fully understood from the specific embodiment hereinafter described by way of example with reference to the accompanying drawings, in which—

Figure 1:
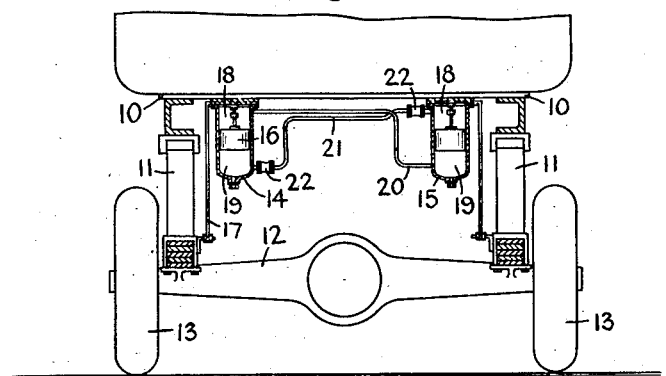
Figure 1 is a diagrammatic view of the arrangement of the shock-absorbers on a vehicle.
Figure 2:
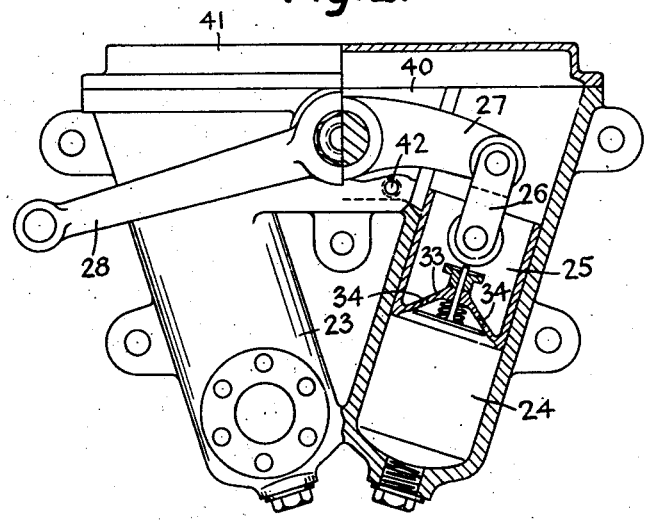
Figure 2 is a sectional elevation of one of the shock-absorbers according to the invention.
Figure 3:
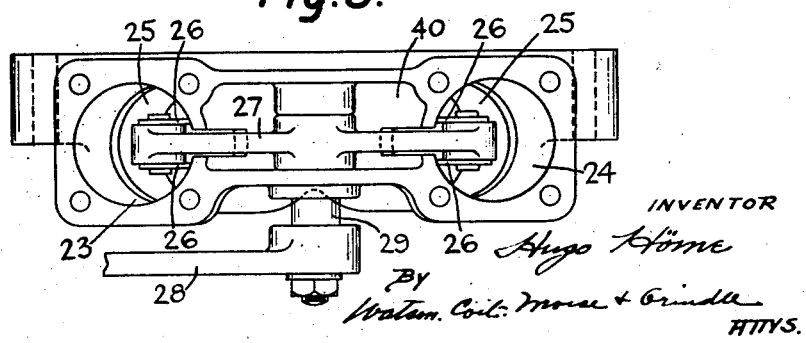
Figure 3 is a plan view of the device shown in Figure 2 with the cover removed.
Figure 4:
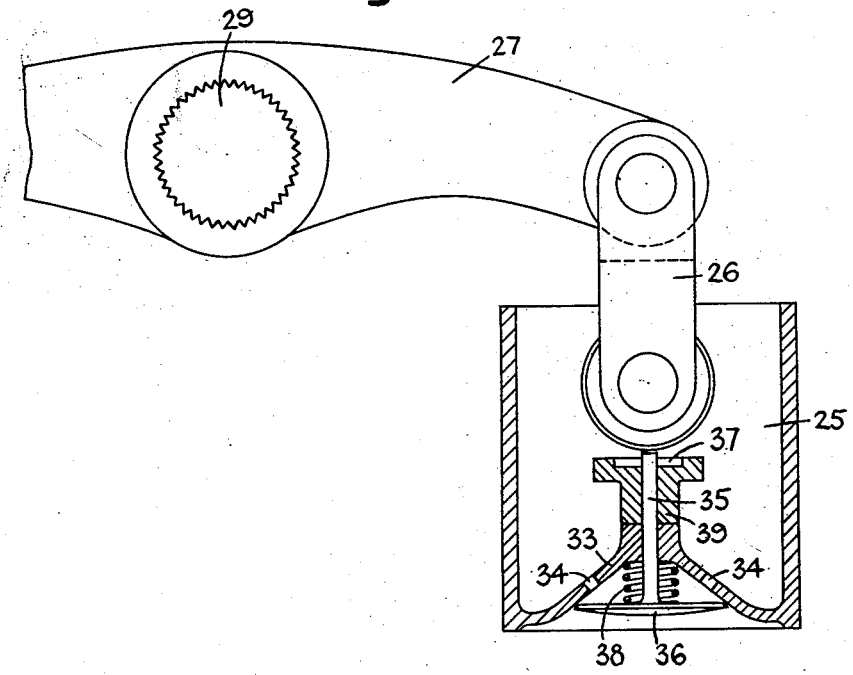
Figure 4 is a detail view.

Referring to Figure 1 of the drawings, there is indicated a vehicle having an under-frame 10 supported by springs 11 on an axle 12 having road-wheels 13. At opposite sides of the vehicle there are provided two shock-absorbers 14 and 15 respectively mounted on the under-frame 10. Each of these shock-absorbers comprises a piston and cylinder device of which the piston 16 is connected by a linkage 17 to the axle 12 so that the piston is caused to be moved in the cylinder in accordance with the relative movement of the under-frame 10 and the axle 12. Each cylinder comprises two operating chambers 18 and 19 containing a liquid, such as oil. The chamber 18 of the shock-absorber 14 is connected by means of a pipe 20 to the chamber 19 of the shock-absorber 15 and, similarly, the chamber 19 of the shock-absorber 14 is connected by means of a pipe 21 to the chamber 18 of the shock-absorber 15. The pipes 20 and 21 are each provided with a throttle-valve 22.

In operation, should relative movements of the under-frame 10 and the axle 12 occur due, for example, to irregularities of the road surface, or to centrifugal force when the vehicle is moving in a curved path, the resulting movement of the piston of the shock-absorber at that side of the vehicle at which this relative movement takes place, serves to transfer the liquid to the shock-absorber at the other side in such manner as to produce a similar movement at that side of the vehicle, so that rolling and tilting of the vehicle is minimized.

Figure 5:
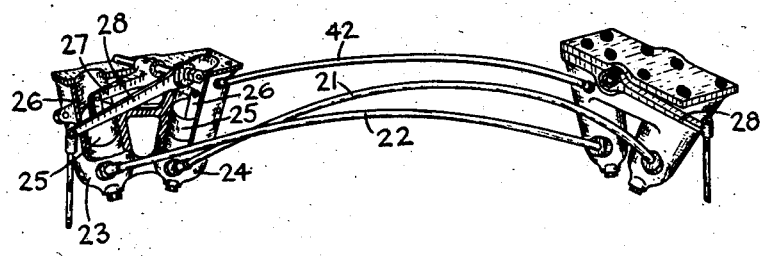
Figure 5 is a diagrammatic view showing the interconnection of the shock-absorbers at opposite sides of the vehicle.

Instead of employing shock-absorbers having a single double-acting piston as shown in Figure 1, two separate pistons may be employed. In the arrangement shown in Figures 2 to 5, the shock-absorber comprises two cylinders 23 and 24, arranged in V-form, and each containing a piston as indicated at 25, which pistons are connected by links 26 to opposite ends of an arm 27 splined on a rotatable pivot pin 29. To this pin there is secured a lever 28 which is connected by means of a linkage such as is indicated at 17 in Figure 1 to the axle of the vehicle. The working chamber below the piston in each of the cylinders 23, 24 is connected to the corresponding working chambers of the shock-absorber at the opposite side of the vehicle, in the manner described with reference to Figure 1, and by means of the pipes 21 and 22 as shown in Figure 5.

According to the present invention there is provided in each of the pistons 25 a conical head or partition 33 which has several small holes 34. A disc valve 36 has a valve stem 35 slidable in the partition 33, and this valve stem is secured to a retaining collar 39 by means of a pin 37. The valve 36, which has a comparatively large diameter, for instance about half that of the piston, is normally maintained in the open position by means of a spring 38, so that there is a small annular gap between the valve 36 and the conical partition 33.

The upper parts of the two cylinders 23 and 24 above the pistons 25, communicate with one another through an auxiliary chamber 40 in the top of the shock-absorber, and closed by means of the cover plate 41.

In operation, when the vehicle is travelling in a curved path, the under-frame 10, tends to incline to one side under the action of centrifugal force, and on this side the piston in one of the cylinders 23, 24 is depressed by means of the arm 27 and linkage 17. The valve 36 of this piston is at once closed by the pressure of the liquid in the chamber below the piston, and the liquid in this chamber is forced through the pipe 21 or 22 as the case may be, to operate the appropriate piston, at the other side of the vehicle. This piston is lifted by the liquid and rocks the arm 27 associated therewith in such direction that the under-frame is also lowered at this side by the same amount by which it has ben depressed on the other side due to centrifugal force. The connection of the shock-absorbers at the two sides of the vehicle is thus positive and acts by so-called pair-closure.

When the action due to centrifugal force ceases, the under-frame, under the action of the springs of the vehicle, tends to return to its initial position, and by the resulting reverse movement of the piston 25 the liquid is caused to flow back again through the pipes 21, 22 to re-establish the normal condition. Also, the valve 36 is again raised from its seat on the partition 13 by the spring 38. The same action takes place when a wheel at one side of the vehicle is subjected to a violent shock. When this takes place the under-frame is lowered relatively to the wheel axle on the other side of the vehicle by the same amount by which it has been lowered on that side directly affected by the shock.

When both road wheels experience a shock, there is merely a flow of the liquid from the one side to the other side of the vehicle; if, however, the shocks acting upon the two wheels are different, the under-frame is lowered positively again on both sides by the corresponding amount, as above described.

With small relative movements of the sprung and unsprung parts of the vehicle, the shock-absorber device acts in quite a different manner. The slight movements of the pistons 25 which take place in such cases are insufficient to cause the valve 36 to be closed, and consequently the liquid can pass through the holes 34 from one side of the piston to the other, and into the auxiliary chamber 40. The eddies thus produced and the frictional resistance to the passage of the liquid, provide an efficacious damping of the vibrations. This damping action also takes place when one of the wheels is lifted slowly with respect to the under-frame; for example, when it runs slowly on to the edge of a side-walk. When the normal conditions are restored, the liquid which has passed through the holes 34 then flows back again into the cylinders. Any loss of liquid from the cylinders 23, 24 due, for example, to leakage in the pipes, is also replaced in this manner from the auxiliary chamber 40, and an equalized distribution of the liquid is maintained by the pipe 42 which connects the auxiliary chamber 40 of the shock-absorber at one side of the vehicle with the corresponding chamber of the shock-absorber at the other side of the vehicle.

The above-mentioned throttle-valves inserted in the pipes 21, 22, provide a means for obtaining a slow flow of liquid through the pipes, but these valves may be dispensed with.

I claim:

1. In a motor vehicle, the combination of relatively movable frame and axle members, two double-acting hydraulic shock absorbers spaced apart and connected between the frame and axle members, each shock absorber having two working chambers, a pipe connection from each working chamber of one shock absorber to the opposite working chamber of the other shock absorber, a throttle valve inserted in each said pipe connection, an auxiliary chamber for each shock absorber communicating by a by-pass with each of the working chambers thereof, and means inserted in said by-pass allowing the fluid in the working chambers to pass through said by-pass only with small relative movements between the frame and the axle.

2. In a motor vehicle, the combination of relatively movable frame and axle members, two double-acting hydraulic shock absorbers spaced apart and connected between the frame and axle members, each shock absorber having two working chambers, a pipe connection from each working chamber of one shock absorber to the opposite working chamber of the other shock absorber, a throttle valve inserted in each said pipe, an auxiliary chamber for each shock absorber communicating by a by-pass with each of the working chambers thereof, and a valve for each by-pass, said valve in its normal position leaving a small gap between the valve and its seat.

3. In a motor vehicle the combination of relatively movable frame and axle members, two double-acting hydraulic shock absorbers spaced apart and connected between the frame and axle members, each shock absorber comprising a body part connected to said frame and having two cylinders arranged in V-shaped relation, a piston working in each of said cylinders and forming a working chamber therein, means connecting said pistons with the axle, a pipe connection between each working chamber of one shock absorber and the opposite working chamber of the other shock absorber, a throttle valve in each said pipe, an auxiliary chamber in said body part of each shock absorber and communicating by a by-pass with each of said working chambers, and means inserted in said by-pass allowing the fluid in the working chambers to pass through said by-pass only with small relative movements between the frame and the axle.

4. In a motor vehicle, the combination of relatively movable frame and axle members, two double-acting hydraulic shock absorbers connected between the frame and axle members, each shock absorber having two working chambers, a pipe connection from each working chamber of one shock absorber, to the opposite working chamber of the other shock absorber, a throttle valve in each of said pipes, an auxiliary chamber for each shock absorber communicating by a by-pass with each of the working chambers, means inserted in said by-pass allowing the fluid in the working chambers to pass through said by-pass only with small relative movements of the frame and axle members, and a further pipe connecting the auxiliary chamber of one shock absorber with the auxiliary chamber of the other shock absorber.

HUGO HÖME.